United States Patent Office 3,767,635
Patented Oct. 23, 1973

3,767,635
PROCESS FOR POLYMERIZATION OF OLEFIN
Kazuo Yamaguchi, Masayoshi Hasuo, and Isao Ito, Tokyo, Japan, assignors to Mitsubishi Chemical Industries, Ltd., Tokyo, Japan
No Drawing. Filed Dec. 3, 1971, Ser. No. 204,749
Claims priority, application Japan, Dec. 11, 1970, 45/110,253; Dec. 15, 1970, 45/112,257
Int. Cl. C08f 1/54, 3/06, 15/40
U.S. Cl. 260—88.2 R                7 Claims

ABSTRACT OF THE DISCLOSURE

Olefin polymerization is conducted using a three component catalyst system comprising: (1) chromium oxide supported on silica or silica-alumina, (2) pentaalkylsiloxyalane or dihydrocarbyl aluminum hydrocarbon oxide and (3) an organoaluminum compound having the formula:

$$AlR_nX_{3-n}$$

wherein R represents a hydrocarbon group; X represents a halogen atom and $n$ represents an integer of 1–3.

BACKGROUND OF THE INVENTION

Field of the invention

This invention relates to a process for polymerization of olefins, e.g., ethylene, or copolymerization of an olefin, such as ethylene with another α-olefin, using a novel catalytic composition of three catalytic components.

Description of prior art

There are numerous well recognized difficulties which can be encountered during the preparation and processing of polyolefin materials. For instance, chromium oxide, supported on a carrier such as silica, alumina, silica-alumina, zirconia, thoria or the like, is a well known catalyst system for the polymerization of olefins, particularly for the polymerization of ethylene. However, this catalyst system is very significantly temperature dependent, such that the average molecular weight of the resulting polymer, will usually be dependent upon the particular polymerization temperature applied. As an example of this, commercial grades of polyethylene, which are suitable for blow molding, will usually have average molecular weights in the range of 50,000 to 100,000. To produce this average molecular weight range, however, the polymerization usually must be effected within the temperature range of 100°–200° C. Although efforts have been directed toward reducing the temperatures necessary to produce this grade of polyethylene, so far, no industrially acceptable technique has been reported which will yield good results at temperatures of less than 100° C., e.g., 80° C.

Another difficulty is that occasionally, these types of polymers will develop stress cracks, known as environmental stress cracking, which is caused by residual or externally applied stress. Stress cracking is frequently accentuated by the presence of detergents, solvents or surfactants. Hence, polymers which exhibit high resistance to environmental stress cracking may quite advantageously be used for molding of pipes, bottles, etc.

Another difficulty in processing is that the polymer should possess good high speed moldability, which is particularly true when processing ethylene homopolymer by blow molding. It is known that, in general, high speed moldability will be increased when the Parison's swelling effect in the blow molding procedure is decreased.

It would be desirable, therefore, to provide a method for forming olefin polymers which possess good resistance to environmental stress cracking, and which possess good high speed moldability.

SUMMARY OF THE INVENTION

Accordingly, it is one object of this invention to provide a polymerization process for olefins which will yield polymers having good high speed moldability and which will possess high resistances to environmental stress cracking.

It is another object of this invention to provide a polymerization catalyst which will enable the production of polyolefins at lower temperatures than herebefore required using conventional catalyst systems.

Another object of this invention is to provide a process for polymerization of olefins with high polymerization activity and which result in resins of excellent blow moldability.

A further object of this invention is to provide a process for polymerization of olefins, particularly ethylene, to obtain polymers having small Parison's swelling values in blow molding, and wherein the average molecular weight of the resulting polymer can be easily adjusted.

A still further object of this invention is to provide a process for copolymerization of olefins, particularly those containing ethylene, to obtain copolymers having high environmental stress cracking resistance.

These and other objects have been attained by using a three component catalyst system comprising: (1) chromium oxide supported on silica or silica-alumina, (2) pentaalkylsiloxyalane or dihydrocarbyl aluminum hydrocarbon oxide and (3) an organoaluminum compound having the formula:

$$AlR_nX_{3-n}$$

wherein R represents a hydrocarbon group, X represents a halogen atom, and $n$ represents an integer of from 1 to 3.

Good results are attained in using this three component catalyst system for the polymerization or copolymerization of ethylene or ethylene and another α-olefins having at least 3 carbon atoms.

DETAILED DESCRIPTION OF PREFERRED EMBODIMENTS

It has been found that the two component catalyst system, comprising a supported chromium oxide, and pentaalkylsiloxyalane or dihydrocarbyl aluminum hydrocarbon oxide, possesses an unexpectedly high polymerization activity, as compared with the use of supported chromium oxide alone, in the polymerization of ethylene. When using the two component system, a greater degree of molecular weight control is possible and polymers having average molecular weights of 50,000–100,000 can effectively be prepared. The two component system is more fully described and claimed in the assignee's copending application of Yamaguchi et al., filed concurrently herewith and having Ser. No. 204,747, filed Dec. 3, 1971, which disclosure is incorporated herein by reference.

The three component catalyst system will additionally provide high polymerization activity, good molecular weight control, and will result in polymers having good high speed moldability and good resistance to environmental stress cracking when blow molded, particularly where the polymer being prepared or processed is an ethylene homopolymer or ethylene containing copolymers.

The three component catalyst system of this invention, therefore, comprises (1) chromium oxide supported on silica or silica-alumina, (2) pentaalkylsiloxyalane or dihydrocarbyl aluminum hydrocarbon oxide and (3) an organoaluminum compound.

The supported chromium oxide component is prepared by dipping, distilling, subliming or by otherwise applying, a suitable chromium compound onto a silica or silica-alumina carrier. The combination is then calcined to reduce the chromium compound to chromium oxide, thereby activating the catalyst. Suitable chromium compounds include the chromium oxides, halides, oxyhalides, phosphates, sulfates, oxalates, alcoholates, or organo chromium compounds. Particularly preferred are chromium trioxide, aceto-acetyl chromate, chromium sulfate or t-butyl chromate.

Calcination activation of the chromium compound-carrier combination is usually effected in the presence of oxygen. However, it may equally be accomplished in an inert atmosphere or in a partial vacuum. This procedure is accomplished at temperature of from 300°–1100° C., and preferably 400°–1,000° C., for several minutes to several tens of hours and especially 10 minutes to 10 hours.

The pentaalkyl siloxyalane, used as the second component, has the formula:

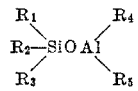

wherein $R_1$, $R_2$, $R_3$, $R_4$, and $R_5$ may each be the same or different and each may respectively represent an alkyl group of 1–10 carbon atoms, which includes such compounds as pentamethyl siloxyalane, pentaethyl siloxyalane, pentabutyl siloxyalane, pentahexyl siloxyalane, pentaoctyl siloxyalane, Si-trimethyl-Al-diethylsiloxyalane, Si-triethyl-Al-dimethylsiloxyalane, Si-triethyl-Al-dibutylsiloxyalane, and Si-tributyl-Al-diethylsiloxyalane. It is especially effective to use a pentaalkylsiloxyalane having lower alkyl groups, such as pentamethylsiloxyalane and Si-trimethyl-Al-diethylsiloxyalane.

The pentaalkyl siloxyalane can usually be prepared by the process shown in the following reaction:

$(R)_3SiOAlX_2 + 2MR \rightarrow (R)_3SiOAl(R)_2 + 2MX$    (1)

$(R)_3SiOM + XAl(R)_2 \rightarrow (R)_3SiOAl(R)_2 + MX$    (2)

wherein R represents an alkyl group of from 1–10 carbon atoms; and M represents an alkali metal; and X represents a halogen atom. (Refer to Journal of Organometallic Chemistry, vol. 1, p. 28, 1963.)

The pentaalkyl siloxyalane may also be prepared by the process shown in the following reaction:

$(R)_3SiOH + Al(R)_3 \rightarrow (R)_3SiOAl(R)_2 + RH$    (3)

wherein R represents an alkyl group of from 1–10 carbon atoms.

These pentaalkyl siloxyalanes are solid at room temperature, are usually not self-ignitable in air, and hence are easily handleable and are soluble in conventional hydrocarbon solvents.

The dihydrocarbyl aluminum hydrocarbon oxides alternatively used as the second component, are those having the formula:

wherein $R_6$, $R_7$ and $R_8$ may each be the same or different and each may respectively represent a hydrocarbon group, preferably a hydrocarbon group having 1–14 carbon atoms.

The hydrocarbon group may be an alkyl group, such as methyl, ethyl, propyl, isobutyl, hexyl, 2-methyl-pentyl, octyl, decyl, and dodecyl; an alicyclic group, such as cyclohexyl and cyclohexylmethyl; an aryl group, such as phenyl and naphthyl; or an aralkyl group such as benzyl. Typical compounds falling within this formula are, for example, methoxy, diethyl-aluminum, ethoxy-diethyl-aluminum, diethyl-aluminum-phenolate, etc. These compounds can easily be prepared by conventional processes, such as by the reaction of trialkyl aluminum and an alcohol.

Suitable organoaluminum compounds used as the third component are those shown by the formula:

$AlR_nX_{3-n}$ wherein R represents a hydrocarbon group, X represents a halogen atom, particularly chlorine, bromine or iodine, and $n$ represents an integer of from 1–3. The hydrocarbon group is preferably one having 1–14 carbon atoms, and includes the alkyl groups, such as methyl, ethyl, propyl and isobutyl; the alicyclic groups, such as cyclohexyl and cyclohexylmethyl; the aryl groups, such as phenyl and naphthyl. Most preferred are those organoaluminum compounds which contain an alkyl group. Among the many usable organoaluminum compounds include triethyl aluminum, trimethyl aluminum, triisobutyl aluminum, trioctyl aluminum, diethyl aluminum chloride, diisobutyl aluminum chloride, ethyl aluminum dichloride, ethyl aluminum sesquichloride, methyl aluminum sesquichloride, etc. Trialkyl aluminium is especially preferred.

The three components of the catalyst system are selected, in general, according to the particular reaction conditions. Preferably, however, they are used in ratios of 0.002–100:1:0.02–10, and especially 0.02–10:1:0.1–10 first component:second component:third component.

In preparing the three component catalyst system, the components are admixed, usually in an inert atmosphere, at temperatures of lower than 50° C., for convenience. The order of contact is not critical.

The catalyst system of this invention is preferably used for the homopolymerization, or the copolymerization of ethylene. In copolymerization, the ethylene may be co-reacted with at least one α-olefin having the formula:

$CH_2 = CH - R$ wherein R represents a hydrocarbon group of from 1–18 carbon atoms. The α-olefins are used in amounts of less than 50 mole percent and preferably from 0.1–30 mole percent. The hydrocarbon group R in the above formula may be an alkyl, aryl, aralkyl, alkaryl or cycloalkyl group. Suitable α-olefins include propylene, butene-1, pentene-1, hexene-1,4-methyl-pentene-1, octene-1, decene-1, dodecene-1, and octadecene-1.

The polymerization mixture may also include one or more diene compounds to provide unsaturated groups into the resulting polymer. Suitable diene compounds include butadiene or isoprene.

The polymerization reaction is usually carried out by dispersing the catalyst system in an inert medium and then, simultaneously or separately, feeding ethylene or ethylene and the α-olefin, at a suitable temperature and pressure. The inert medium is preferably an aliphatic hydrocarbon, such as pentane, hexane, heptane, octane, isooctane; ali cyclic hydrocarbon, such as cyclopentane, cyclohexane; or an aromatic hydrocarbon, such as benzene or toluene. It is also possible to use other conventional inert solvents commonly used for polymerization reactions.

Since the catalyst system will be deactivated by moisture or oxygen, it is preferable to use anhydrous and oxygen-free reactants and solvents.

The concentration of the catalyst system in the inert medium is preferably 0.1–200 mg./l. of the first component and 0.01–100 mg./l. of the second component and 0.01–100 mg./l. of the third component.

The polymerization reaction is usually carried out at relatively low temperatures, such as 0–250° C., and especially 40–90° C., under relatively low pressures, such as atmospheric pressure —100 atm., and especially atmospheric pressure —20 atm.

It is possible to easily control the average molecular weight or other physical properties of the resulting polymer by charging hydrogen to the polymerization reaction zone. In this instance, the amount of hydrogen charged to the polymerization reaction will be dependent upon the particular conditions of polymerization, and the average molecular weight of the product desired. Good results are obtainable with less than 300 mole percent hydrogen, and preferably less than 100 mole percent hydrogen, based on the amount of ethylene.

The three component catalyst system of this invention may be used in solution polymerization, slurry polymerization or emulsion polymerization reactions. In slurry polymerization, the polymer may be precipitated from the solvent medium polymerization temperatures of 60–90° C. This technique is therefore especially preferred from the viewpoint of aftertreatment of the product, since the polymer can be obtained by simply filtering the polymer slurry from the inert solvent. Accordingly, special precipitation procedures are unnecessary, as compared with solution polymerization methods.

Using the present catalyst system, the polymerization reaction can be conducted until more than 3,000 g. of polymer is produced per gram of supported chromium oxide. At this level of polymerization, it becomes unnecessary to remove the catalyst from the product, which therefore eliminates complex separation procedures.

This catalyst system is characterized by high catalytic activity at high temperatures as well as at relatively lower temperatures and its use enables easy control of the average molecular weight of the resulting polymer. Moreover, the polymerization reaction can be easily effected at relatively lower temperatures so that the resulting polymer may be produced in the form of a slurry without causing the viscosity of the slurry to increase beyond easy handleability. Accordingly, the concentration of the resulting polymer in the slurry can be greater than 30% by weight, which provides a variety of industrial advantages, such as reduction in the size of the reactor equipment and decrease in the recycling of the medium.

The resulting polymer product is generally characterized by excellent blow-molding properties. The homopolymer of ethylene is characterized by a low Parison's swelling effect in blow-molding, and has excellent high speed moldability. The copolymer resulting from the copolymerization of ethylene with the α-olefins has excellent resistance to environmental stress cracking and are characterized by good blow-molding properties.

Having generally described the invention, a further understanding can be obtained by reference to certain specific examples which are provided for purposes of illustration only and are not intended to be limiting in any manner unless otherwise specified. In the examples, the "branching coefficient" is measured by infrared spectrum and represents the number of branched alkyl groups per 1,000 carbon atoms. For example, methyl branches (pendant methyl) groups are provided in polyethylene molecule and in copolymers of ethylene and propylene. Ethyl branches are provided in polyethylene molecule and in copolymers of ethylene and butene-1. The branching coefficient is thus shown as the number of pendant $CH_3$ groups/1000 C., or the number of pendant $C_2H_5$ groups/1000 C.

EXAMPLE 1

10 g. of silica were placed into an aqueous solution of $CrO_3$ compound to form a slurry, and the slurry was dried at 120° C. and then activated at 800° C. for 1 hour in a dry air atmosphere. The resulting first component contained 1% Cr. 500 ml. of dehydrated and deoxidized n-hexane were fed into a 1 l. autoclave equipped with an electro-magnetic stirrer; 52 mg. of said first component, 4.3 mg. of the second component of Si-trimethyl-Al-diethylsiloxyalane, and 2.9 mg. of the third component of triethylaluminum were also charged to the reactor and ethylene was fed at 80° C. under a pressure of 10 kg./cm.$^2$ of ethylene to effect a constant pressure polymerization reaction for 1 hour. 238 g. of a white, powdery polyethylene, having an average molecular weight of 260,000, was obtained. The polymerization velocity per first component of catalyst was 4,080 g. EP/g. cat./hour.

(Reference 1)

Into a 1 l. autoclave, equipped with electromagnetic stirrer, 500 ml. of n-hexane, and 250 mg. of the first component of catalyst prepared in accordance with the process of Example 1, were charged. Ethylene was then fed at 80° C., under a pressure of 10 kg./cm.$^2$ of ethylene, for 1 hour, to effect a constant pressure polymerization. 89 g. of a white powdery polyethylene having an average molecular weight of 240,000 was obtained. The polymerization velocity per first component of catalyst was 335 g. EP/g. cat./hour.

EXAMPLE 2

The process of Example 1 was repeated, using the same catalyst as in Example 1 and the same solvent. 7 kg./cm.$^2$ of ethylene, and 3 kg./cm.$^2$ of hydrogen at 80° C. for 1 hour, were fed into the reactor so as to conduct constant pressure polymerization. 163 g. of a white powdery polyethylene, having an average molecular weight of 90,000, was obtained.

(Reference 2)

Into a 1 l. autoclave, equipped with an electromagnetic stirrer, 500 ml. of n-hexane, 52 mg. of the first component and 8.7 mg. of the second component of the catalyst, prepared as described in Example 1, were charged thereto. 3.0 kg./cm.$^2$ of hydrogen and 7 kg./cm.$^2$ of ethylene were fed to the reactor at 80° C. in order to conduct a constant pressure polymerization by the addition of ethylene for 1 hour. 203 g. of a white powdery polyethylene having an average molecular weight of 81,000 was obtained.

EXAMPLE 3

The physical characteristics, especially the swelling effect during high speed molding of the polymer resulting from the process of Example 2 and Reference 2, were respectively measured. The results shown in Table I were obtained. The molded product was found to have a very thin, smooth skin.

TABLE I

| | Melt index [1] | Swelling effect [2] |
|---|---|---|
| Example 1 | 0.25 | 4.8 |
| Reference 1 | 0.29 | 7.7 |

[1] Melt index was measured by ASTM D-1238.
[2] "Swelling effect" is the ratio of the cross-sectional area of the nozzle to the cross-sectional area of the extruded product, when the melted resin is extruded at 190° C. at a shearing velocity of 100 sec.$^{-1}$ from a die having 2 mm. in diameter and 8 mm. long. The high speed moldability is the property of decreasing memory.

EXAMPLE 4

Into a 1 l. autoclave, equipped with stirrer, 500 ml. of n-hexane and 52 mg. of the first composition were charged, and the ratio of the Si-trimethyl-Al-diethylsiloxyalane second component and the triethyl aluminum third component are shown in Table II. The polymerization process of Example 2 was repeated, and the melt index and swelling power was repeated in accordance with Example 3. The results are shown in Table II. No rough skin was found on the molded product.

TABLE II

| | Melt index | Swelling effect |
|---|---|---|
| Si/Al (mole/mole): | | |
| 0.1 | 0.23 | 4.5 |
| 0.5 | 0.27 | 4.3 |
| 1 | 0.25 | 4.8 |
| 3 | 0.28 | 5.2 |
| 10 | 0.36 | 5.5 |

EXAMPLE 5

The process of Example 2 was repeated except that the third component of catalyst was changed as shown in Table III and the ratio of Si/Al of the second component/the third component, was 1. The melt index and the swelling effect of the resulting polymer was measured, in accordance with the process of Example 3. The results are shown in Table III and no rough skin was found.

TABLE III

| Third component | Melt index | Swelling effect |
|---|---|---|
| Trimethyl aluminum | 0.29 | 4.9 |
| Triethyl aluminum | 0.25 | 4.8 |
| Triisobutyl aluminum | 0.32 | 5.1 |
| Diisobutyl aluminum chloride | 0.33 | 4.9 |
| Diethyl aluminum chloride | 0.24 | 4.3 |
| Ethyl aluminum dichloride | 0.22 | 4.6 |

EXAMPLE 6

The process of Example 1 was repeated by using the same catalyst and solvent and feeding 2.0 kg./cm.$^2$ of hydrogen, 0.5 kg./cm.$^2$ of propylene and 7.5 kg./cm.$^2$ of ethylene at 80° C. to conduct a constant pressure polymerization by adding ethylene for 1 hour.

172 g. of a white powdery polyethylene having an average molecular weight of 85,000 was obtained. The branching coefficient of the polymer was measured by infrared spectrum. A copolymer of ethylene-propylene having a branching coefficient of 5 was found.

(Reference 3)

Into a 1 l. autoclave, equipped with an electromagnetic stirrer, 500 ml. of dehydrated and deoxidated n-hexane, 52 mg. of the first component of catalyst of Example 1, and 8.7 mg. of Si-trimethyl-Al-diethylsiloxyalane, were charged thereto, and 1.0 kg./cm.$^2$ of propylene, 9.0 kg./cm.$^2$ of ethylene were fed to the reactor at 80° C. to effect a constant pressure polymerization reaction by the addition of ethylene for 1 hour. 235 g. of a white powdery copolymer of ethylene-propylene having an average molecular weight of 890,000 was obtained. A copolymer of ethylene-propylene having a branching coefficient of 5.2 was found.

EXAMPLE 7

The environmental stress cracking resistance (ESCR) of the polymers resulting from the process of Example 6 and Reference 3 were respectively measured. The results are shown in Table IV.

TABLE IV

| | Example 6 | Reference 3 |
|---|---|---|
| Melt Index [1] | 0.26 | 0.23 |
| ESCR (hr.) [2] | 1,200 | 64 |
| Branch coefficient (pend CH$^3$ No./1,000 C.) | 5.0 | 5.2 |

[1] ASTM D-1238.
[2] ASTM D-1693; 5 of 10 pieces were broken.

EXAMPLE 8

The process of Example 6 was repeated except the amount of triethyl aluminum was changed as shown in Table V. Various properties of the resulting copolymers were measured in accordance with the methods of Example 7. The results are shown in Table V.

TABLE V

| Si[1]/Al[2] (mole/mole) | Polymerization velocity, g. EP/g. cat. hr. (1st component) | Melt index | ESCR (hr.) | Branch coefficient (Pend CH$_3$/1,000 C.) |
|---|---|---|---|---|
| 0.1 | 3,400 | 0.26 | 1,700 | 7.1 |
| 0.5 | 3,200 | 0.24 | <2,000 | 6.2 |
| 1 | 3,300 | 0.26 | 1,200 | 5.0 |
| 3 | 3,700 | 0.32 | 800 | 5.1 |
| 10 | 3,900 | 0.35 | 650 | 4.2 |

[1] The second component (C$_2$H$_5$)$_2$ Al OSi(CH$_3$)$_3$.
[2] The third component (C$_2$H$_5$)$_3$ Al.

EXAMPLE 9

The process of Example 6 was repeated except using the organo-aluminum compound as stated in Table VI. The third component is equivalent to the second component used.

Various properties of the resulting copolymers were measured in accordance with the method of Example 7.

TABLE VI

| Third component | Melt index | ESCR (hr.) |
|---|---|---|
| Trimethyl aluminum | 0.28 | 1,350 |
| Triethyl aluminum | 0.26 | 1,200 |
| Trioctyl aluminum | 0.31 | 1,420 |
| Diethyl aluminum chloride | 0.27 | 2,000< |
| Ethyl aluminum dichloride | 0.34 | 2,000< |

EXAMPLE 10

The process of Example 6 was repeated except 10 g. of the α-olefin as shown in Table VII was used instead of propylene. The various properties of the resulting copolymers were measured in accordance with the method of Example 6. Each sample was confirmed to be copolymer by IR analysis.

TABLE VII

| α-olefin | Melt index | ESCR (hr.) |
|---|---|---|
| 1-butene | 0.33 | 1,450 |
| 1-hexene | 0.29 | 1,600 |

EXAMPLE 11

Into a 1 l. autoclave, equipped with an electromagnetic stirrer, 500 ml. of n-hexane, 52 mg. of the first component of Example 1, 2.6 mg. of the second component of diethyl aluminum monoethoxide, 2.3 mg. of the third component of triethyl aluminum were charged thereto and 10 kg./cm.$^2$ of ethylene were fed thereto at 80° C. to conduct a constant pressure polymerization, by the addition of ethylene over 1 hour. 234 g. of a white powdery polyethylene having an average molecular weight of 274,000 was obtained. The polymerization velocity was 4,500 g. EP/g. cat./hr. (1st component).

(Reference 4)

Into a 1 l. autoclave, equipped with an electromagnetic stirrer, 500 ml. of n-hexane, 52 mg. of the first component of Example 1, 2.6 mg. of the second component of diethyl aluminum monoethoxide were charged and 10 kg./cm.$^2$ of ethylene was fed thereto at 80° C. to conduct a constant pressure polymerization by the addition of ethylene over 1 hour. 184 g. of a white powdery polyethylene, having an average molecular weight of 268,000, was obtained. The polymerization velocity was 3520 g. EP/g. cat./hr. (1st component).

EXAMPLE 12

In accordance with the process of Example 11, the same catalyst and solvent was used, and 10 kg./cm.$^2$ of ethylene and a specific amount of hydrogen were fed to the reactor at 80° C. to conduct a constant pressure polymerization, by the addition of ethylene over 1 hour. The results are shown in Table VIII.

TABLE VIII

| H$_2$ charge (kg./cm.$^2$) | Total pressure (kg./cm.$^2$) | Polymerization velocity, g. EP/g. cat. hr. (1st comp.) | Average MW |
|---|---|---|---|
| 0 | 10 | 4,500 | 274,000 |
| 2.5 | 12.5 | 4,730 | 123,000 |
| 5.0 | 15.0 | 4,810 | 101,000 |
| 10.0 | 20.0 | 4,360 | 76,000 |

(Reference 5)

Into a 1 l. autoclave, equipped with an electromagnetic stirrer, 500 ml. of n-hexane, 52 mg. of the first catalyst component of Example 1, were charged and 10 kg./cm.$^2$ of ethylene, and 10 kg./cm.$^2$ of hydrogen were fed thereto at 80° C. to conduct a constant pressure polymerization, by the addition of ethylene, for 1 hour. A white powdery polyethylene, having an average molecular weight of 183,000, was obtained.

(Reference 6)

In accordance with the process of Reference 1, the same catalyst and solvent were used and 10 kg./cm.² of ethylene was used, and 10 kg./cm.² of hydrogen were fed at 80° C. to the reaction to effect a constant pressure polymerization, by the addition of ethylene, for 1 hour. A white powdery polyethylene having an average molecular weight of 183,000 was obtained.

EXAMPLE 13

The process of Example 11 was repeated except the second component stated in Table IX was replaced with diethyl aluminum monoethoxide, and the molar ratio of the second component to the third component was 1. The results are shown in Table IX.

TABLE IX

| $R_2AlOR'$ | B.P. | Polymerization velocity (g. EP/g. cat. hr.) (1st comp.) |
|---|---|---|
| $(C_2H_5)_2AlOCH_3$ | 95° C./2 mm. Hg | 3,800 |
| $(C_2H_5)_2AlOC_2H_5$ | 108° C./10 mm. Hg | 4,500 |
|  | 90° C./0.001 mm. Hg | 7,400 |
| $(i-C_4H_9)_2AlOCH_3$ | | 5,100 |

EXAMPLE 14

The process of Example 11 was repeated except the third component stated in Table X was replaced with triethyl aluminum, and the molar ratio of the second component to the third component was 1.

TABLE X

| $AlR_nX_{3-n}$ | Polymerization velocity (g. EP/g. cat. hr.) (1st comp.) |
|---|---|
| $Al(C_2H_5)_3$ | 4,500 |
| $Al(i-C_4H_9)_3$ | 4,350 |
| $Al(C_2H_5)_2Cl$ | 3,600 |
| $Al(C_8H_{17})_3$ | 4,100 |

EXAMPLE 15

The process of Example 11 was repeated except that molar ratio of diethyl aluminum monoethoxide to triethyl aluminum was changed as stated in Table XI. The results are stated in Table XI.

TABLE XI

| 2nd comp./3rd comp. (mole/mole): | Polymerization velocity (g. EP/g. cat. hr.) (1st comp.) |
|---|---|
| 0.3 | 4,460 |
| 1.0 | 4,500 |
| 3.5 | 5,070 |
| 10.0 | 4,120 |

EXAMPLE 16

In accordance with the process of Example 11, the same catalyst and solvent was used, and 1.5 kg./cm.² of propylene, 1.0 kg./cm.² of hydrogen, and 8.0 kg./cm.² of ethylene were fed at 80° C. to conduct a constant pressure polymerization, by the addition of ethylene, for 1 hour.

183 g. of a white powdery copolymer of ethylene having an average molecular weight of 97,000 was obtained. The resulting copolymer of ethylene-propylene had a methyl branching coefficient of 7.0/1000 C.

(Reference 7)

In accordance with the process of Reference 5, the same catalyst component and solvent was used and 1.5 kg./cm.² of propylene, 0.5 kg./cm.² of hydrogen, and 10 kg./cm.² of ethylene were fed, to conduct a constant pressure polymerization for 1 hour.

171 g. of a white powdery copolymer having an average molecular weight of 101,000 was obtained. The resulting copolymer of ethylene-propylene had a methyl branching coefficient of 6.5/1000 C.

EXAMPLE 17

The ESCR of the polymer resulting from the processes of Example 16 and Reference 7 were measured in accordance with the method of Example 7. The results are shown in Table XII.

TABLE XII

| | Melt index | ESCR |
|---|---|---|
| Example 16 | 0.24 | 1040 |
| Reference 7 | 0.22 | 360 |

EXAMPLE 18

In accordance with the process of Example 11, 5 kg./cm.² of hydrogen was fed at 80° C. using the same catalyst and solvent, and then ethylene was fed to provide 15 kg./cm.² of total pressure to conduct a constant pressure polymerization by the addition of ethylene. 248 g. of a white powdery polyethylene having an average molecular weight of 101,000 was obtained.

EXAMPLE 19

The process of Example 11 was repeated except using 3.6 mg. of diethyl aluminum phenoxide instead of diethyl aluminum ethoxide, and 1.0 kg./cm.² of hydrogen was fed at 80° C. and then ethylene was fed to provide 6.0 kg./cm.² of total pressure to conduct a constant pressure polymerization, for 1 hour.

198 g. of a white powdery polyethylene, having an average molecular weight of 98,000, was obtained.

(Reference 8)

The process of Example 18 was repeated except triethyl aluminum was removed, and 4 kg./cm.² of hydrogen was fed at 80° C. and then ethylene was fed to provide 14 kg./cm.² of total pressure to conduct a constant pressure polymerization for 1 hour. 178 g. of a white powdery polyethylene having an average molecular weight of 105,000 was obtained.

(Reference 9)

The process of Example 19 was repeated except triethyl aluminum was removed, and 0.6 kg./cm.² of hydrogen was fed at 80° C. and then ethylene was fed to provide a total pressure of 6 kg./cm.² to conduct a constant pressure polymerization for 1 hour.

183 g. of a white powdery polyethylene having an average molecular weight of 102,000 was obtained.

EXAMPLE 20

The swelling effect which corresponds to high speed moldability was measured for each polymer obtained in Examples 18, 19, and References 8 and 9, in accordance with the method of Example 3. The results are shown in Table XIII. The skin of the molded product was not rough.

TABLE XIII

| | Melt index | Swelling effect |
|---|---|---|
| Example 18 | 0.22 | 4.4 |
| Example 19 | 0.24 | 4.8 |
| Reference 8 | 0.20 | 5.4 |
| Reference 9 | 0.21 | 6.0 |

Having now fully described the invention, it will be apparent to one of ordinary skill in the art that many changes and modifications can be made thereto without departing from the spirit or scope of the invention.

What is claimed as new and desired to be secured by Letters Patent is:

1. In a process for the polymerization of an olefin, the improvement comprising effecting polymerization in contact with a three component catalyst system comprising: (1) supported chromium oxide, (2) pentaalkylsiloxyalane or dihydrocarbyl aluminum hydrocarbon oxide and (3) an organoaluminum compound having the formula:

$$AlR_nX_{3-n}$$

wherein R represents a hydrocarbon group, X represents a halogen atom, and $n$ represents an integer of from 1–3.

2. The process of claim 1, wherein the olefin is ethylene or ethylene and at least one α-olefin having at least 3 carbon atoms.

3. The process of claim 1, wherein the chromium oxide supported on a carrier selected from the group consisting of silica and silica-alumina is combined with the pentaalkylsiloxyalane having the formula

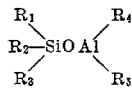

wherein $R_1$, $R_2$, $R_3$, $R_4$ and $R_5$ are the same or different and respectively represent an alkyl group having 1–10 carbon atoms, and with the dihydrocarbyl aluminum hydrocarbon oxide having the formula:

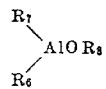

wherein $R_6$, $R_7$ and $R_8$ are the same or different and respectively represent hydrocarbon groups of 1–14 carbon atoms.

4. The process of claim 1, wherein the ratio molar of said three components of the catalyst system is 0.002–100:1:0.02–10, (1):(2):(3).

5. The process of claim 1, wherein the polymerization is conducted at 0–250° C. under a pressure of from atmosphere pressure to 20 atm.

6. The process of claim 1, wherein the polymerization is conducted in the presence of hydrogen.

7. The process of claim 1, wherein the polymerization is slurry polymerization.

References Cited

UNITED STATES PATENTS

| | | | |
|---|---|---|---|
| 3,629,216 | 12/1971 | Iwasaki et al. | 260—94.9 D |
| 3,081,286 | 3/1963 | McKinnis | 260—94.9 D |
| 2,944,049 | 7/1960 | Edmonds, Jr. | 260—94.9 D |

OTHER REFERENCES

Encyclopedia of Polymer Science and Technology, vol. 3, pp. 667–669, Interscience, New York (1965).

Encyclopedia of Polymer Science and Technology, vol. 7, pp. 266–282, Interscience, New York (1967).

JOSEPH L. SCHOFER, Primary Examiner

A. HOLLER, Assistant Examiner

U.S. Cl. X.R.

260—80.7, 80.78, 94.9 E, 94.9 D